(12) United States Patent
Priante

(10) Patent No.: US 9,592,693 B2
(45) Date of Patent: Mar. 14, 2017

(54) PROCESS FOR DECORATING THE SURFACE OF A SUBSTRATE WITH A THREE-DIMENSIONAL AND TACTILE EFFECT

(75) Inventor: Simone Priante, Alba (IT)

(73) Assignee: MIROGLIO TEXTILE S.r.l., Alba (IT)

( * ) Notice: Subject to any disclaimer, the term of this patent is extended or adjusted under 35 U.S.C. 154(b) by 794 days.

(21) Appl. No.: 13/315,934

(22) Filed: Dec. 9, 2011

(65) Prior Publication Data

US 2012/0240384 A1    Sep. 27, 2012

(30) Foreign Application Priority Data

Mar. 25, 2011   (EP) ..................................... 11425078

(51) Int. Cl.
*B41M 5/025* (2006.01)
*B41M 3/06* (2006.01)
*B41M 3/16* (2006.01)

(52) U.S. Cl.
CPC ............... *B41M 5/025* (2013.01); *B41M 3/06* (2013.01); *B41M 3/16* (2013.01); *Y10T 29/49982* (2015.01)

(58) Field of Classification Search
CPC .......... B41M 5/025; B41M 3/06; B41M 3/16
USPC ................. 29/527.2; 101/491, 492; 156/230
See application file for complete search history.

(56) References Cited

U.S. PATENT DOCUMENTS

| | | | | |
|---|---|---|---|---|
| 2,654,687 A * | 10/1953 | Fridolph | ................ | B05D 1/286 156/239 |
| 3,582,426 A * | 6/1971 | Meissner | ................ | B32B 27/00 156/277 |
| 3,834,925 A * | 9/1974 | Matsumura | .............. | B41M 3/06 101/467 |
| 4,196,033 A * | 4/1980 | Arai | ...................... | D06N 3/0097 156/196 |
| 5,019,198 A * | 5/1991 | Schafer et al. | ................ | 156/230 |
| 5,506,031 A * | 4/1996 | Spain et al. | ................... | 428/172 |
| 5,657,603 A * | 8/1997 | Goodhart et al. | ............... | 52/519 |
| 5,702,558 A * | 12/1997 | Schadel | ......................... | 156/323 |
| 5,897,735 A * | 4/1999 | Peskin | .......................... | 156/230 |
| 6,105,502 A * | 8/2000 | Wagner et al. | ............... | 101/491 |
| 6,458,743 B1 * | 10/2002 | Menin | ..................... | B41M 5/035 428/913 |
| 6,610,164 B2 * | 8/2003 | Luetgert et al. | ............... | 156/230 |
| 2001/0036510 A1 * | 11/2001 | Engle et al. | ................... | 427/384 |

(Continued)

FOREIGN PATENT DOCUMENTS

| | | |
|---|---|---|
| DE | 19922450 A1 | 11/2000 |
| GB | 1584117 | 2/1981 |

(Continued)

OTHER PUBLICATIONS

European Search Report for Application No. EP11425078.

*Primary Examiner* — Jacob Cigna
(74) *Attorney, Agent, or Firm* — Sughrue Mion, PLLC

(57) ABSTRACT

The process for decorating the surface of a substrate comprises the stages of printing a three-dimensional decorative pattern on one surface of a polymer film using resin, placing the decorated surface of the film and at least one surface of the substrate in contact and providing thermal energy thereto, and detaching the film from the substrate onto the surface of which the three-dimensional decorative pattern has been transferred.

18 Claims, 4 Drawing Sheets

(56) References Cited

U.S. PATENT DOCUMENTS

| | | | | |
|---|---|---|---|---|
| 2003/0113520 A1* | 6/2003 | Takahashi | ............ | B32B 37/144 |
| | | | | 428/201 |
| 2004/0163757 A1* | 8/2004 | Peng et al. | .................... | 156/202 |
| 2006/0110617 A1* | 5/2006 | Kitaike | ............ | B29C 45/14811 |
| | | | | 428/522 |
| 2009/0311428 A1* | 12/2009 | Rotzoll | ........................ | 427/295 |
| 2011/0049766 A1* | 3/2011 | Del Mundo | ............. | B41M 5/24 |
| | | | | 264/400 |
| 2013/0209819 A1* | 8/2013 | Noda | .................... | B32B 27/308 |
| | | | | 428/522 |

FOREIGN PATENT DOCUMENTS

| | | | |
|---|---|---|---|
| JP | 56051267 A | * | 5/1981 |
| WO | WO 00/20218 A1 | | 4/2000 |
| WO | WO 02/057090 A1 | | 7/2002 |

* cited by examiner

PROCESS FOR DECORATING THE SURFACE OF A SUBSTRATE WITH A THREE-DIMENSIONAL AND TACTILE EFFECT

FIELD OF THE INVENTION

This invention relates to a process for decoration of the surface of a substrate.

BACKGROUND OF THE INVENTION

In this respect the use of paper and polymer films printed with pigments of the dispersed class (Transfer Printing) using machines of the rotogravure type to place an image having a material aspect (wood, marble, stone) or abstract aspect (geometrical patterns) on manufactured articles of various kinds covered with a continuous layer of a paint product derived from a liquid or powder chemical formulation is known.

Rotogravure printing makes it possible to obtain visual results of a high level of quality, with high image definition, including through four-colour printing, without however generating any effect of a tactile or three-dimensional type, which is a limitation.

SUMMARY OF THE INVENTION

The object of this invention is to overcome the above-mentioned disadvantage of the prior art.

This object is accomplished through a process for decorating the surface of a substrate comprising the stages of:
  printing a three-dimensional decorative pattern on one surface of a polymer film using resin,
  placing the decorated surface of this film and at least one surface of the substrate in contact and providing thermal energy thereto, and
  detaching the film from the substrate, onto the surface of which the three-dimensional decorative pattern has been transferred.

DETAILED DESCRIPTION OF THE INVENTION

Figure 1:
FIG. 1 is an image of a three-dimensional decorative pattern provided on a surface of a polymer film according to a first example.

The aesthetic effect produced by the presence of the three-dimensional decorative pattern is accentuated by exposure of the decorated substrate to obliquely incident light.

The substrate is for example of metal, in particular aluminium, ceramic or glass. Advantageously, before the film and the substrate are placed in contact the surface of the latter is coated with an optional layer of chromium oxide and then a further layer of a paint product preferably having a thickness of between 1 and 300 μm.

In principle, the thermal resistance properties of the film used in the process according to the invention should be such as to permit thermal transfer of the decorative pattern to the substrate without compromising its definition.

This film may have a clear or opaque appearance and be formed of a layer of extruded material belonging to one of the following classes: polyesters, in particular PET, PBT, PTT, polypropylenes, polyamides, polyurethanes, polyvinyls, cellulose, lignin, or several identical or different co-extruded layers.

The resins for the three-dimensional decorative pattern may for example comprise at least one component selected from: Cellulose acetate, Cellulose acetobutyrate, Cellulose nitrate, Cellulose propionate, Epoxides, Melamine-formaldehyde, Polyamides, Polyamide imide, Polyacrylonitrile, Polybutene-1, Polybutylene terephthalate, Polycarbonate, Polychlorotrifluoroethylene, Polydiallyl phthalate, Polyethylene, Chlorinated polyethylene, Polyether imide, Polyether ketone, Polyether terketone, Polyether sulphones, Polyethylene terephthalate, Phenol formaldehyde, Polyimide, Polyisobutylene, Polymethacrylimide, Polymethyl methacrylate, Poly-4-methylpentene-1, Polyoxymethylene, Polyformaldehyde, Polyacetal, Polypropylene, Polyphenyl ether, Polyphenylene oxide, Polyphenylene sulphide, Polystyrene, Polysulphone, Polythiophen, Polytetrafluoroethylene, Polyurethane, Polyvinyl butyral, Polyvinyl chloride, Chlorinated polyvinyl chloride, Polyvinylidene chloride, Polyvinylidene fluoride, Polyvinyl fluoride, Regenerated cellulose, Silicones, Urea-formaldehyde, Unsaturated polyester, Polydimethylsiloxane.

In addition to this, these resins may also comprise an expanding additive capable of causing an increase in volume of the three-dimensional decorative pattern on the substrate. This increase in volume is brought about—as will be explained in detail below—by exposure to temperatures within the range from 40 to 300° C. which give rise to the formation of gases, vapours, foam and/or gel or chemical reactions capable of generating macromolecules of larger volume than that of the starting reagents.

The resins may also comprise any combination of known additives, in particular stabilising additives against the action of solar radiation and atmospheric agents in general.

These resins may also comprise an organic pigment belonging to at least one of the Nitroso, Nitro, Monoazo, Diazo, Stilbene, Diphenylmethane, Triphenylmethane, Xanthene, Acridine, Quinoline, Methine, Thiazole, Indamine, Indophenol, Azine, Oxazine, Thiazine, Aminoketone, Anthraquinone, Indigoid or Phthalocyanine classes and their derivatives, and/or an inorganic pigment belonging to at least one of the classes:
  White pigments: white lead, basic lead sulphate, zinc white, zinc sulphide, lithopone, antimony oxide, titanium dioxide, calcium plumbate;
  Inert pigments or fillers: barium sulphate (barytes or fixed white), calcium carbonate, dolomite, gypsum, silica, silicates (asbestos, bentonite, kaolin, mica, talc);
  Black pigments: black iron oxide, carbon blacks (lamp black, charcoal black, ivory black or bone black, graphite);
  Blue pigments: cobalt blue, ultramarine blue, Prussian blue;
  Green pigments: chromium phosphate, chromium oxide, hydrated chromium oxide, chromium green, Schweinfurt green, zinc green;
  Brown pigments: brown iron oxide, ochre, umber, burnt Sienna;

Yellow pigments: yellow iron oxide, cadmium yellow, chromium yellow, zinc yellow, nickel titanate, lead cyanamide, strontium chromate;

Orange pigments: cadmium orange, chromium orange, molybdate orange, lead silico-chromate;

Red pigments: red iron oxide, aluminium minium, lead minium, cadmium red, chromium red;

Metal pigments: aluminium, bronze, lead, copper, zinc.

All in all, the combination of several resins of organic and inorganic nature and possible additives makes it possible to generate a variety of decorative patterns depending upon the type of incision used to create the printing rollers or cylinders through which the resin mixture is printed onto one surface of the polymer film.

Advantageously, the three-dimensional decorative pattern is printed on one surface of the polymer film through a rotogravure technique, flexographic printing, screen printing, offset printing or a combination thereof which provides for the use of one or more incised rollers. In addition to this it is also possible to print a two-dimensional decorative pattern, in particular using a sublimable ink—together with the three-dimensional decorative pattern—on that surface of the film.

The provision of heat energy—which causes transfer of the three-dimensional decorative pattern from the film to the substrate—takes place through conduction, for example following contact with a heated surface such as the plate of a press or the cylinder of a rotary press, convection and/or irradiation, in such a way that the temperature lies between 40 and 300° C. This input of thermal energy may for example take place in a continuous or batch stove.

In an embodiment of the process according to the invention contact between the film and substrate takes place by folding the film in the form of a bag which completely wraps the substrate, joining together the edges of the film and drawing out the air present in the space between the film and substrate in such a way that the decorated surface of the film is substantially in contact with the entire surface of the substrate. As an alternative to drawing out the air, contact may be achieved through mechanical means, such as presses or calenders. For their part the edges of the film may be joined by double-sided adhesive tapes, adhesives, welding or fusion techniques in general.

Further advantages and characteristics of this invention will be apparent from the following examples of embodiments provided in a non-restrictive way.

Example 1

A bi-orientated polyethylene terephthalate film of nominal thickness 19 μm was printed with a mixture of unpigmented resins which in particular were deposited on one surface through a roller having incisions which recreated a three-dimensional decorative pattern having an oak-grain effect. FIG. 1 is an image of this decorated surface.

On the other hand, a first layer of chromium metal oxides was formed on the surface of a substrate formed of a sheet of aluminium of nominal thickness 1 mm by using oxidation-reduction processes. The first layer encourages the adhesion of a second layer of paint, obtained following electrostatic deposition of a powder paint product of the polyurethane type (AkzoNobel UZ-884) and its polymerisation through exposure to a temperature of 200° C. for 15 minutes.

After cooling, the surface of the substrate was placed in intimate contact with the decorated surface of the film and raised to the temperature of 203° C. in about 90 seconds using a hot plate (static press).

Temperature was monitored through one or more thermocouples in contact with the surface of the substrate.

Following application of the abovementioned temperature and pressure conditions the three-dimensional decorative pattern was transferred from the film to the substrate as a mirror image.

Figure 2:
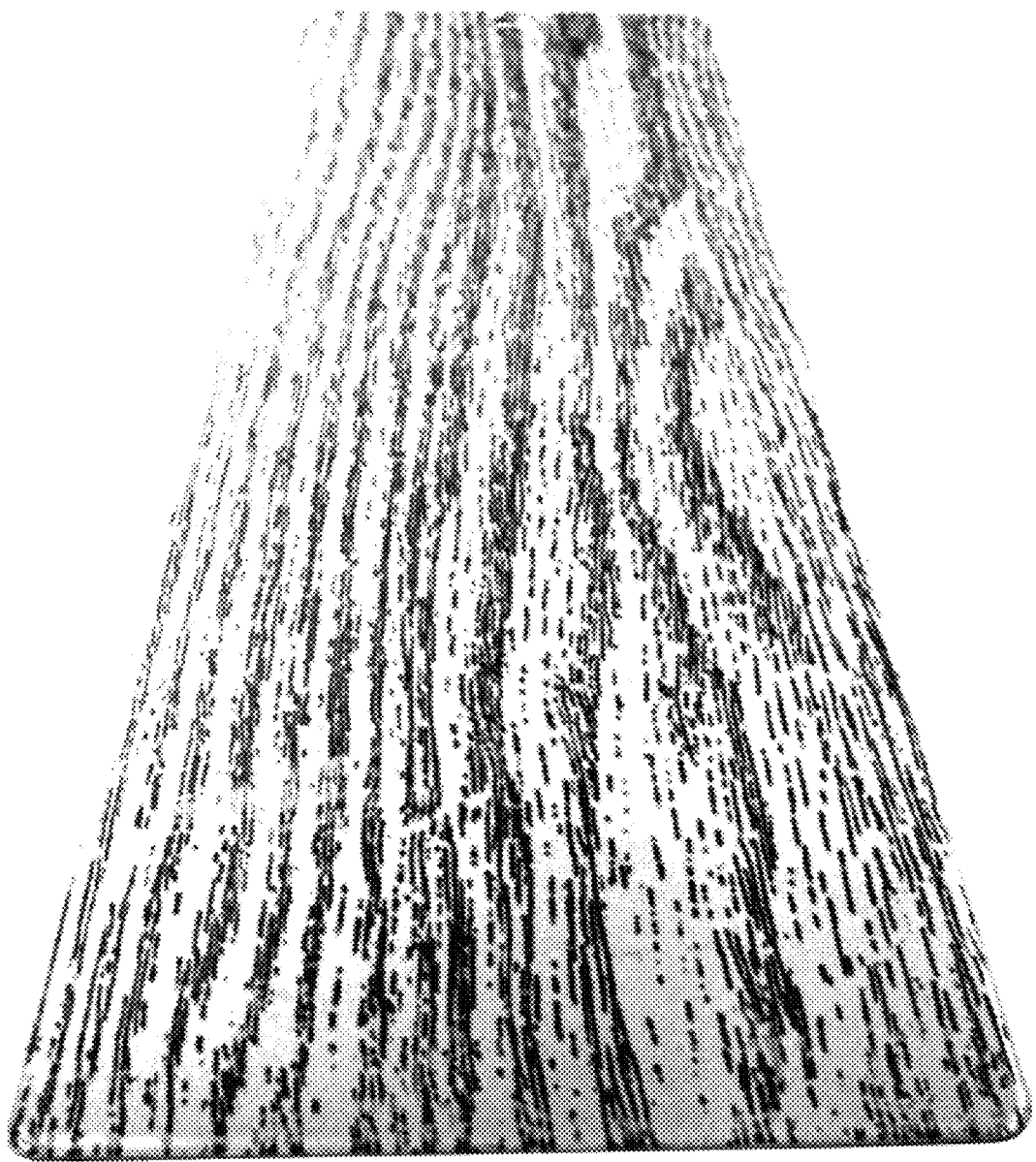
FIG. 2 is an image of a surface of a substrate having the decorative pattern transferred thereto in the first example.

The film was finally removed from the decorated substrate, an image of which is shown in FIG. 2.

Example 2

Figure 3:
FIG. 3 is an image of a three-dimensional decorative pattern provided on a surface of a polymer film according to a second example.

A bi-orientated polyethylene terephthalate film of nominal thickness 19 μm was printed with a mixture of unpigmented resins which in particular were deposited on one surface through a roller having incisions which recreated a three-dimensional decorative pattern having an oak-grain effect. In the same printing process inks of the dispersed (subliming) class were deposited on the film in order to generate a "covering wood" effect. FIG. 3 is an image of this decorated surface.

On the other hand, a first layer of chromium metal oxides was formed on the surface of a substrate formed of a sheet of aluminium of nominal thickness 1 mm by using oxidation-reduction processes. The first layer encourages the adhesion of a second layer of paint, obtained following electrostatic deposition of a powder paint product of the polyurethane type (AkzoNobel UZ-881) and its polymerisation through exposure to a temperature of 200° C. for 15 minutes.

After cooling, the film was wrapped around the substrate in the form of a bag. The bag was sealed by joining the free ends of the film by fusion produced by an ultrasound metal tip. Air present in the space between the film and substrate was then removed using a rotary pump in such a way that the decorated surface of the film was in intimate contact with substantially the entire surface of the substrate.

The substrate wrapped in the bag was then placed in a stove which was raised to a temperature of 203° C. in approximately 90 seconds through the heat generated by the controlled combustion of a stoichiometric mixture of methane and air.

Temperature was monitored by one or more thermocouples in contact with the surface of the substrate.

Following the aforesaid temperature and negative pressure conditions the aforementioned three-dimensional decorative pattern was transferred from the film to the substrate as a mirror image. In addition to the three-dimensional decorative pattern the latter also had the appearance of wood generated by the subliming inks.

Figure 4:
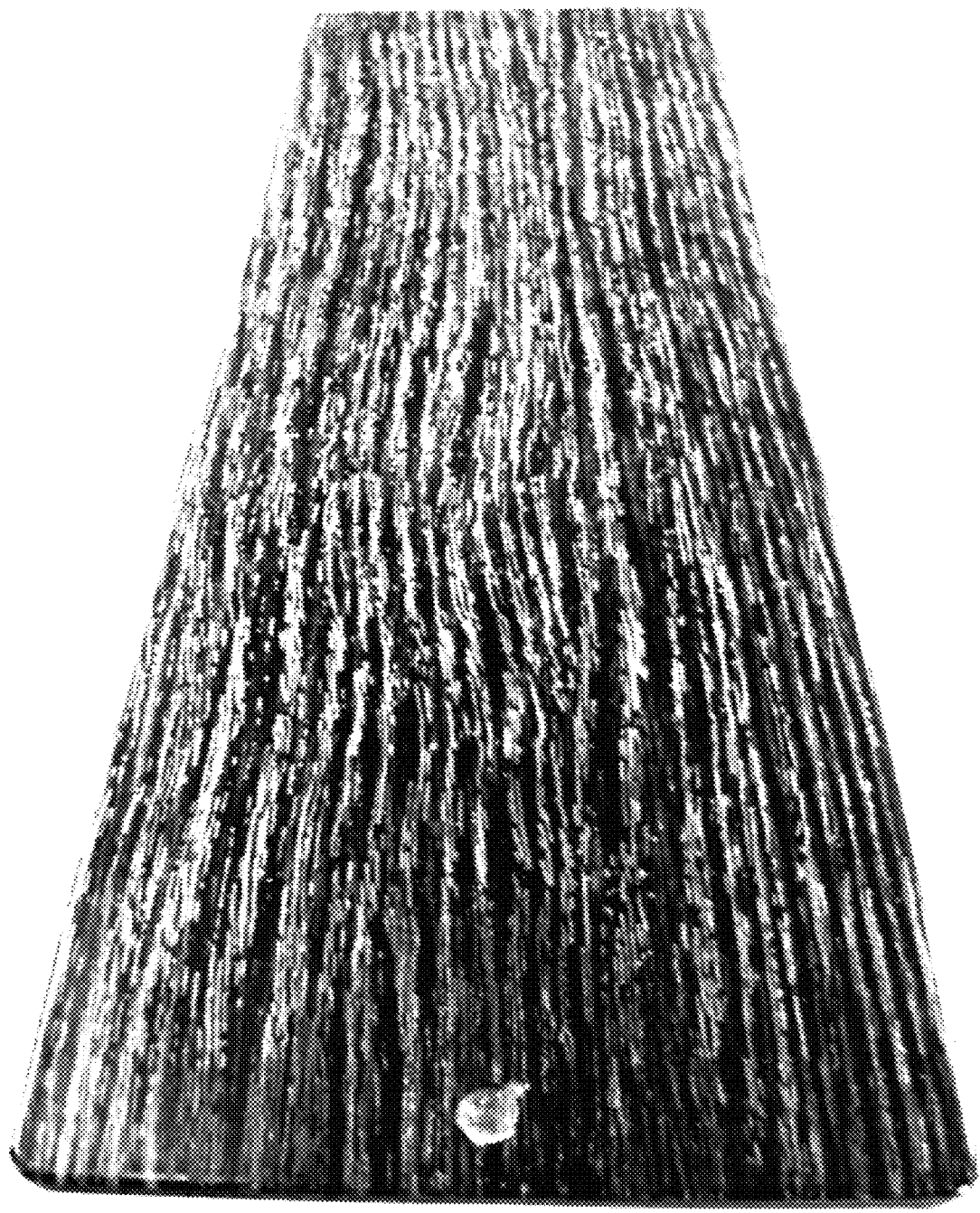
FIG. 4 is an image of a surface of a substrate having the decorative pattern transferred thereto in the second example.

The film was finally detached from the decorated substrate, and an image of this is shown in FIG. 4.

Naturally, the principle of the invention remaining the same, the details of construction and embodiments may be varied widely with respect to those described purely by way of example, without thereby departing from the scope of the invention as defined by the appended claims.

What is claimed is:

1. A process for decorating a surface of a substrate comprising the stages of:
   printing a three-dimensional decorative pattern having a tactile effect on the surface of a polymer film using resin to provide a decorated surface on the polymer film, coating the surface of the substrate with a layer of chromium oxides and then with a further layer of paint product, placing the decorated surface of the polymer film and the surface of the substrate in contact with each other and providing thermal energy thereto to transfer the three-dimensional decorative pattern onto the surface of the substrate such that the further layer of paint product is covered by the three-dimensional decorative pattern, and detaching the film from the substrate, wherein said polymer film is formed of at least one layer of extruded material, wherein the three-dimensional pattern is formed from resins which comprise at least one component selected from: cellulose acetate, cellulose acetobutyrate, cellulose nitrate, cellulose propionate, epoxides, melamine-formaldehyde, polyamides, polyamide imide, polyacrylonitrile, polybutene-1, polybutylene terephthalate, polychlorotrifluoroethylene, polydiallyl phthalate, polyethylene, polyether imide, polyether ketone, polyether terketone, polyether sulphones, polyethylene terephthalate, phenol formaldehyde, polyimide, polyisobutylene, polymethacrylimide, poly-4-methylpentene-1, polyoxymethylene, polyformaldehyde, polyacetal, polypropylene, polyphenyl ether, polyphenylene oxide, polyphenylene sulphide, polysulphone, polythiophen, polytetrafluoroethylene, polyurethane, polyvinyl butyral, polyvinyl chloride, chlorinated polyvinyl chloride, polyvinylidene chloride, polyvinylidene fluoride, polyvinyl fluoride, regenerated cellulose, silicones, urea-formaldehyde, unsaturated polyester, polydimethylsiloxane, wherein the resins also comprise an expanding additive capable of causing an increase in volume of the three-dimensional decorative pattern on the substrate, and wherein the increase in volume is caused by exposure to temperatures within the range between 40 and 300° C. which causes the formation of gases, vapours, foam and/or gel or chemical reactions capable of generating macromolecules of larger volume than that of the starting reagents.

2. A process according to claim 1, wherein the film is formed of a layer of extruded material belonging to one of the following classes: polyesters, polypropylenes, polyamides, polyurethanes, polyvinyls, celluloses, and lignin.

3. A process according to claim 1, wherein the substrate is of metal.

4. A process according to claim 1, wherein printing of the three-dimensional decorative pattern on one surface of the polymer film takes place through a rotogravure, flexigraphic printing, screen printing or offset technique, or a combination thereof, which provides for the use of one or more incised rollers.

5. A process according to claim 1, wherein the resins also comprise an additive imparting stability against solar radiation and atmospheric agents.

6. A process according to claim 1, wherein the resins of the three-dimensional decorative pattern comprise at least one organic pigment belonging to at least one of the classes: nitroso, nitro, monoazo, diazo, stilbene, diphenylmethane, triphenylmethane, xanthene, acridine, quinoline, methine, thiazole, indamine, indophenol, azine, Oxazine, thiazine, aminoketone, anthraquinone, indigoid, phthalocyanin and their derivatives, and/or an inorganic pigment belonging to at least one of the classes:

white pigments: white lead, basic lead sulphate, zinc white, zinc sulphide, lithopone, antimony oxide, titanium dioxide, calcium plumbate;

inert pigments or fillers: barium sulphate, calcium carbonate, dolomite, gypsum, silica, silicates;

black pigments: black iron oxide, carbon blacks;

blue pigments: cobalt blue, ultramarine blue, Prussian blue;

green pigments: chromium phosphate, chromium oxide, hydrated chromium oxide, chromium green, Schweinfurt green, zinc green;

brown pigments: brown iron oxide, ochre, umber, burnt Sienna;

yellow pigments: yellow iron oxide, cadmium yellow, chromium yellow, zinc yellow, nickel titanate, lead cyanamide, strontium chromate;

orange pigments: cadmium orange, chromium orange, molybdate orange, lead silico-chromate;

red pigments: red iron oxide, aluminium minium, lead minium, cadmium red, chromium red;

metal pigments: aluminium, bronze, lead, copper, zinc.

7. A process according to claim 1, wherein thermal energy is provided through at least one of conduction, convection and irradiation such that a temperature of the decorated surface of the film and the surface of the substrate in contact therewith lies between 40 and 300° C.

8. A process according to claim 1, wherein the contact between the film and the substrate takes place by folding the film into a form of a bag completely wrapping the substrate, joining edges of the film and mechanically placing the decorated surface of the film in contact with substantially the entire surface of the substrate.

9. A process according to claim 1, wherein the film is formed of several co-extruded layers.

10. A process according to claim 1, wherein the substrate is of aluminium, ceramic or glass.

11. A process according to claim 1, wherein the layer of paint product has a thickness of between 1 and 300 μm.

12. A process according to claim 1, wherein the substrate is aluminum.

13. A process according to claim 1, wherein together with the three-dimensional decorative pattern a two-dimensional decorative pattern is also printed on the surface of the polymer film.

14. A process according to claim 13, wherein the printing is through a sublimable ink.

15. A process according to claim 1, wherein the contact between the film and the substrate takes place by folding the film into a form of a bag completely wrapping the substrate, joining edges of the film and removing air present in the space between the film and the substrate in such a way that the decorated surface of the film is in contact with substantially the entire surface of the substrate.

16. A process according to claim 15, wherein the edges of the film are joined by means of double-sided adhesive tape, adhesives, welding or fusion.

17. A process according to claim 1, wherein the layer of paint product is of the polyurethane type.

18. A process according to claim 17, wherein the layer of paint product is applied by electrostatic deposition.

* * * * *